United States Patent
Manova-Elssibony et al.

(10) Patent No.: US 9,711,978 B2
(45) Date of Patent: Jul. 18, 2017

(54) REMOTE CHARGING SYSTEM

(71) Applicant: HUMAVOX LTD., Kfar Saba (IL)

(72) Inventors: Asaf Manova-Elssibony, Tel Aviv (IL); Oded Golan, Tel Aviv (IL)

(73) Assignee: HUMAVOX LTD., Kfar Saba (IL)

(*) Notice: Subject to any disclaimer, the term of this patent is extended or adjusted under 35 U.S.C. 154(b) by 71 days.

(21) Appl. No.: 14/376,192

(22) PCT Filed: Feb. 4, 2013

(86) PCT No.: PCT/IL2013/050102
§ 371 (c)(1),
(2) Date: Aug. 1, 2014

(87) PCT Pub. No.: WO2013/114378
PCT Pub. Date: Aug. 8, 2013

(65) Prior Publication Data
US 2014/0375261 A1    Dec. 25, 2014

Related U.S. Application Data

(60) Provisional application No. 61/595,084, filed on Feb. 5, 2012, provisional application No. 61/597,959, filed
(Continued)

(51) Int. Cl.
*H02J 7/00* (2006.01)
*H02J 7/02* (2016.01)
*H02J 17/00* (2006.01)

(52) U.S. Cl.
CPC ............ *H02J 7/0021* (2013.01); *H02J 7/007* (2013.01); *H02J 7/0052* (2013.01); *H02J 7/025* (2013.01); *H02J 17/00* (2013.01); *H02J 7/0042* (2013.01)

(58) Field of Classification Search
CPC ........ H02J 17/00; H02J 7/0021; H02J 7/0042; H02J 7/0052; H02J 7/007; H02J 7/025
See application file for complete search history.

(56) References Cited

U.S. PATENT DOCUMENTS

2005/0099290 A1    5/2005  Govari
2007/0080798 A1    4/2007  Jung et al.
(Continued)

FOREIGN PATENT DOCUMENTS

EP    1 928 071 A2    6/2008

OTHER PUBLICATIONS

International Search Report of the corresponding International Application No. PCT/IL2013/050102, mailed Oct. 5, 2013.

*Primary Examiner* — Vuthe Siek
(74) *Attorney, Agent, or Firm* — Leason Ellis LLP

(57) ABSTRACT

A charging device is provided for communicating with one or more consumer devices for remotely charging at least one of them upon demand of the consumer. The charging device comprises a transmitter unit associated with an antenna unit comprising a power antenna for defining at least one charging zone for transmitting charging power toward it; a receiver for receiving signals from consumers located within the charging zone; and a controller unit configured to be responsive to a request signal from a consumer indicative of demand for charging, to initiate a charging process of the consumer by radiation from the power antenna toward the consumer to supply power required for operating a functional unit of the consumer. The power antenna may comprise an array of directional antenna elements, each defining the charging zone within a different angular segment of entire charging space defined by a radiation pattern of the antenna array.

12 Claims, 5 Drawing Sheets

Related U.S. Application Data on Feb. 13, 2012, provisional application No. 61/600,721, filed on Feb. 20, 2012.

(56) References Cited

U.S. PATENT DOCUMENTS

| | | | |
|---|---|---|---|
| 2007/0178945 A1* | 8/2007 | Cook | H02J 17/00 |
| | | | 455/572 |
| 2007/0298846 A1 | 12/2007 | Greene et al. | |
| 2009/0284082 A1 | 11/2009 | Mohammadian | |
| 2010/0201189 A1 | 8/2010 | Kirby | |
| 2010/0201533 A1 | 8/2010 | Kirby | |
| 2010/0315045 A1* | 12/2010 | Zeine | H02J 7/025 |
| | | | 320/137 |
| 2012/0304767 A1* | 12/2012 | Howard | A42B 3/046 |
| | | | 73/504.03 |

* cited by examiner

REMOTE CHARGING SYSTEM

CROSS-REFERENCE TO RELATED PATENT APPLICATIONS

This application is a U.S. National Phase Application under 35 U.S.C. §371 of International Patent Application No. PCT/IL2013/050102, filed Feb. 4, 2013, and claims the benefit of priority under 35 U.S.C. Section 119(e) of U.S. Application Ser. No. 61/595,084, filed Feb. 5, 2012; U.S. Application Ser. No. 61/597,959, filed Feb. 13, 2012 and U.S. Application No. 61/600,721, filed Feb. 20, 2012, all of which are incorporated by reference in their entireties. The International Application was published on Aug. 8, 2013 as International Publication No. WO 2013/114378 A1.

TECHNOLOGICAL FIELD AND BACKGROUND

The present invention relates to a remote charging system and method for charging one or more electronic devices in at least one consumer's side.

There are many devices that use electricity as their energy source, but due to their mobility needs they use batteries as their energy supplier. Such energy consumers may include computer mouse, television remote control, DVD remote control, air condition remote control, shaver, electrical tooth brash, wireless line phone extension, camera, etc. Each such consumer needs a periodical replacement of its battery. Since batteries are pollution sources, and since their replacement is tiresome (you need to keep stock; you need to replace; you need to throw them to a specific garbage container) there is a need for a system that will charge the consumers without the need of the user to do anything.

When it comes to medical device the nuisance is even greater and in some cases replacement of a battery may be a life threatening procedure. There are many medical implanted and attached devices that use batteries as a disposable electrical source. Implanted batteries are required to power the implanted devices for five to eight years, with minimal drop in the output voltage and without any undesirable effects such as swelling due to gas generation. Replacing the batteries in the implanted device, such as heart pace maker, requires surgery associated with risk, discomfort and cost.

Due to the burden of battery change, about half of the occupied space of an implanted medical device is consumed by the internal battery to give as much life span to the battery as possible. In addition, since the energy in the implanted device is so expensive, physicians compromise on their requirements, and important features like collecting data from the implanted device are done in long time intervals in order to save the energy. In attached devices, such as hearing aid, change of batteries is required in a relatively high frequency that may vary from once a day to once a week. Thus, it becomes a nuisance to the user.

Therefore it is obvious that a mechanism that will exclude the need for disposable batteries is desired. Currently available external charging rewires physical attachment of the external unit to the patient body and active involvement of the patient in the activation of the charging process.

GENERAL DESCRIPTION

There is a need in the art in a novel technique enabling effective remote charging of various electronic devices (e.g. implanted and/or attached devices) without active involvement of a user (e.g. patient). This will abolish the need for replacement of batteries and/or the need for a physical attachment of electric devices needed to be charged to a specific dedicated charger.

The present invention provides a novel smart charging system that allows remote charging of various consumers (constituting consumer devices), in accordance with the consumer's location relative to a charging unit (e.g. distance, direction, and type of consumer).

In accordance with one major aspect of the invention, the charging process is initiated by a consumer, i.e. a so-called charge per demand. In other words, responsibility for charging relies on the consumer device that upon its demand for power, it will be charged from a charging device. Thus, a charging system of the invention provides for using one supplier (charging device) adapted to serve multiple clients (consumers' devices) located within at least one charging zone defined by the charging device. However, it should be clear to a man skilled in the art that under certain circumstances, such as a very big space/room or a room/space of certain shape, a large number of consumers' devices, etc., the charging system includes a plurality of charging devices each defining a charging space formed by one or more charging zones and capable of serving multiple consumers' devices located in said charging space.

It should be understood that according to the invention the charging process in initiated at the consumer's side in the meaning that the charge process starts at the charging device upon receipt of the request signal from the consumer. However, the request signal may be generated at the consumer side in either push or pool mode of operation. For example, the charging device is configured and operable to initiate transmission of inquiring signals to the charging zone to cause the consumer located in said zone to transmit the request signal indicative of the demand for charging (push mode). Alternatively, the charging device is configured and operable in a pool mode to be activated by communication initiated by the consumer, where this communication includes transmission of the request signal by the consumer.

In some embodiments, the consumer device may be configured and operable for monitoring (continuously or periodically) the stored energy level in an energy storage unit associated with a functional unit at the consumer device, and, upon identifying a limited energy condition, generating the request signal to the remote charging device. In other embodiments, the consumer device may be configured and operable for periodically generating the request signal to the remote charging device, in accordance with a priory known energy consumption of the energy storage unit based on the operation of the functional unit in the consumer device. In yet further embodiments, the consumer device may be configured and operable to be responsive to inquiring signals from a remote charging device to monitor the stored energy level in the energy storage unit, and, upon identifying a limited energy condition, generating the request signal to the remote charging device.

Thus, according to one broad aspect of the invention, there is provided a charging device configured and operable for communicating with one or more consumers for remotely charging at least one consumer upon demand of said consumer, said charging device comprising a transmitter unit associated with an antenna unit comprising a power antenna configured to define at least one charging zone for transmitting charging power to said at least one charging zone, a receiver for receiving signals from consumers located within said charging zone, and a controller unit, said controller being configured and operable to be responsive to a request signal from a consumer indicative of demand for charging to initiate a charging process of the consumer by radiation from the antenna unit toward said consumer to supply power required for operating a functional unit of said consumer.

In some embodiments, the power antenna in the charging device comprises an array of directional antenna elements, each antenna element defining the charging zone within a different angular segment of entire charging space defined by a radiation pattern of the antenna array.

According to another broad aspect of the invention, there is provided a consumer device comprising a functional unit requiring electric power for operation, and a communication unit comprising a controller unit, an antenna unit for receiving electromagnetic radiation from surroundings and generating electric output, and a harvester circuit configured for receiving the electric output of the antenna unit and transferring corresponding power to an energy storage unit associated with said functional unit, the controller unit being configured and operable for generating a request signal addressed to a remote charging device indicative of a demand for charging said energy storage unit.

According to yet another broad aspect of the invention, there is provided a charging system for remotely charging multiple consumer devices upon demand from the consumer devices, the system comprising:

at least one charging device comprising a transmitter unit associated with an antenna unit comprising a power antenna configured to define at least one charging zone for transmitting charging power to said at least one charging zone, a receiver for receiving signals from consumers located within said charging zone, and a controller unit, said controller being configured and operable to be responsive to a request signal from a consumer indicative of demand for charging to initiate a charging process of the consumer by radiation from the antenna unit toward said consumer to supply power required for operating a functional unit of said consumer; and at least one consumer device being a subscriber of said at least one charging device, the consumer device comprising a functional unit requiring electric power for operation, and a communication unit comprising a controller unit, an antenna unit for receiving electromagnetic radiation from surroundings and generating electric output, and a harvester circuit configured for receiving the electric output of the antenna unit and transferring corresponding power to an energy storage unit associated with said functional unit, the controller unit being configured and operable for generating the request signal addressed to said at least one remote charging device indicative of a demand for charging said energy storage unit.

Thus, the invention provides a novel smart remote system for charging devices that use electric power as their energy source but due to their mobility needs cannot get it from the main AC electric power network available at every home and office, and also provides novel configuration of the charging device and of the consumer device to be used in such charging system.

In accordance with variations of the present invention, the charging device may be responsible, as an option, but not limited to, for optimization of the transmission parameters and for transmitting the energy (power) to the consumers. Each consumer may be responsible as an option, but not limited to, for measuring its power inventory; for requesting its need for charging; for capturing energy (power) from the charging device; for harvesting the energy and converting it to a DC power and for storing the energy for later usage.

In accordance with variation of the present invention, a request for charging by a consumer may include information on its identity only and according to the signal level and the antenna element that received the signal, the charging device may have enough information to establish the charging protocol. Alternatively, a request for charging by a consumer may include detailed information about the consumer's location relative to the charging subunit, its distance from the charging subunit, the current charging level and other parameters.

The request for ceasing the charging process may be initiated by a consumer upon reaching a predetermined level. Alternatively, the charging device may stop the charging process of a specific consumer according to data received from the consumer as part of the demand for charging and processed by the charging device.

A person that is in need for a smart remote charging system of the invention for charging consumer devices in its home, office or at any other confined environment, may install a charging device in a location that has a range that covers all consumers that need to be charged. In addition, consumer devices include a harvesting unit that is functionally adapted to harvest and store energy (power) delivered to each consumer by the charging device.

In some embodiments, the charging process may start by signals produced by at least one consumer "calling" the charging device and demanding charging. From the demand received, the charging device may define a charging protocol including duration of charging session, frequency, direction and all other relevant parameters.

The charging process may further occur while the consumer is on moving by real time updating the location information of the moving consumer in the charging device. A moving consumer may be for example an implanted/attached medical device that is "moving" in the room together with the person carrying it. It may also be a TV remote controller that the user moves from one place to the other any time he/she uses it.

In some embodiments, the charging device may be dedicated for a specific consumer and as such, it may be incorporated/assimilated within a master device and charge peripheral consumers of the master device. For example, a charger may be assimilated within a computer for charging a wireless mouse, wireless keyboard, wireless loudspeaker or any other wireless peripheral that functionally is related to the computer and need to be charged, a charger may be assimilated within a television for charging its remote control, and such.

In some embodiments, the charging process of several consumers may occur simultaneously. Such simultaneous charging may be performed for example, but not limited to, by using a directional antenna array, and by activating at least one antenna element for each consumer that requires charging in a specific time and space point.

In some embodiments, the configuration is such that if the charging device is unable to cover the whole space of client consumers, additional charging devices (one or more), may be used to cover the whole space.

In some embodiments, in a scenario that a consumer fails to identify the charging device in its proximity, the consumer will keep sending signals searching for the charging device in preset time intervals until identification is succeeded.

In some embodiments, in a scenario when the charging device is not functioning for a relatively long period of time, such as, but not limited to in a case of electricity shutdown, the charging device may send, upon new activation, signals searching for the consumers, either automatically or triggered by a user having the charging system the invention.

In some embodiments, in a scenario that a consumer identifies that the process failed, either because the charging device was not in its vicinity, or if the amount of stored energy is not accumulated or any other pre determined parameter, the consumer will indicate the situation either internally by an indicator such as, but not limited to, light/sound indication, or by sending the information to the charging device, and the charging device will functionally operate in accordance with the data received.

In some embodiments, in a scenario when the charging device is not functioning for a long period of time, such as, but not limited to in a case of electricity shutdown, the charging device may have a database unit, functional in such situations, that records each consumer's location and power level prior to the shutdown, Upon new activation, the charging device may use the stored data for initial charging.

In some embodiments, the charging device may have a user interface indicating the status of each consumer and enables a user having the charging system of the invention to activate manually charging of each consumer separately. The user interface may also serve the user for resetting the system, determining preferred functions and parameters and calibrate the system according to the consumers to be charged and the user specific needs and preferences.

BRIEF DESCRIPTION OF THE DRAWINGS

Examples illustrative of variations of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. The figures presented are in the form of schematic illustrations and, as such, certain elements may be drawn greatly simplified or not-to-scale, for illustrative clarity. The figures are not intended to be production drawings.

FIG. 5A is a schematic illustration of a radiation pattern of a single directional antenna; and FIG. 5B is a schematic illustration of a "directional" antenna array radiation pattern in accordance with variations of the present invention, in which the antenna array is directed for transmitting/receiving in a specified beam width and direction; FIG. 5C is a schematic illustration of an "omnidirectional" antenna array radiation pattern in accordance with variations of the present invention, in which the antenna array is directed for transmitting/receiving with maximal gain to all directions.

DESCRIPTION OF PREFERRED VARIATIONS OF THE INVENTION

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

Figure 1:
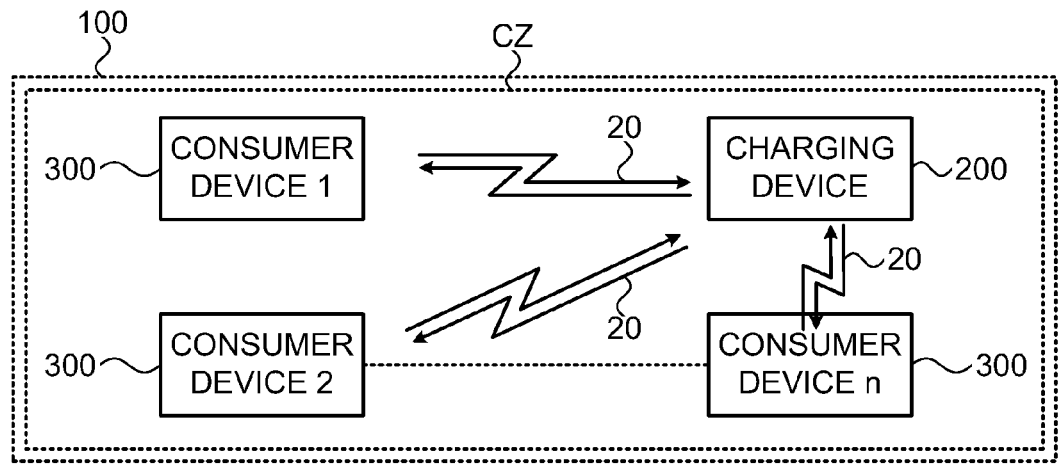
FIG. 1 is a schematic illustration of a charging system of the invention where one charging device is associated with multiple consumers.

Reference is made to FIG. 1 which is a schematic illustration of a charging system 100 for remote charging of multiple consumers 300 according to the consumers demand. The system 100 includes one or more charging devices each defining its charging zone, namely a zone "covered" by radiation generated by the respective charging device. In the example illustrated in FIG. 1 a single charging device 200 is exemplified, but it should be understood that the invention is not limited to this example, as well as not limited to any specific number of charging device. In case of multiple charging devices, they are associated with different charging zones.

It should be noted that different charging zones may be spatially separated zones (i.e. at different locations) and/or a so-called different spectral zones, namely frequency zones/ranges for charging consumers' device by radiation of different frequency bands. In the description below, the charging zone and its associated consumers (consumers' devices) are exemplified by the spatial locations thereof, but it should be understood that the invention is not limited in this respect and charging by different frequencies may be used as alternative or addition.

Thus, in the present example, the system 100 includes a charging device 200 defining a charging zone CZ. The charging device 200 is configured for communication with any number n of remote consumers (consumers' device) 300 which are located within the charging zone CZ (e.g. in a space that is covered by radiation emitted by the charging device) and configured for communication with the charging device 200. Practically, the charging device 200 is located in a space where the potential consumers are distributed, such as, but not limited to, a home and or an office. The system 100 is configured so as to allow the consumer 300 to be positioned randomly in the charging zone CZ (e.g. random distribution of multiple consumers) and may be moved from one location to another without interfering with the charging process. The charging device 200 communicates with each consumer 300 by wireless energy (radiation) transmission 20. This may be electromagnetic radiation, preferably in the radio frequency range, but it may also be other type of energy transferring, e.g. acoustic (typically ultrasound) radiation. Such wireless radiation transmission is used for power charging but may additionally be used for data exchange between the charging device and the consumer.

The consumer 300 generates and transmits an activating signal/data addressed to the charging device 200. The charging device 200 is responsive to the activating signal to direct the charging radiation towards the consumer's location, as will be exemplified more specifically further below.

According to some embodiments, the configuration is such that the consumer includes a sensing utility that monitors a charge status of its battery and upon identifying a condition of a predetermined charge level (threshold), activates a transmitter that generates and transmits the activating signal. In some other embodiments, the energy consumption of the consumer's battery is a priory known or predicted, and a transmitter in the consumer is preprogrammed to timely generate such an activating signal.

The consumer device may be configured such that the generated activating signal includes or is accompanied with certain identification data enabling identification of the type of consumer and/or its location (at least a directional location). Generally, the activating signal may be indicative of the presence of the specific consumer within the charging zone of the charging device; and/or of a request for charging, and/or position (directional) of the specific consumer that is to be charged. As will be exemplified further below, the configuration may be such that the activating signal activates a dedicated power transmitter (antenna or antenna segment) in the charging device responding by radiation transmission in a certain direction associated with the location of the specific consumer.

Figure 2:
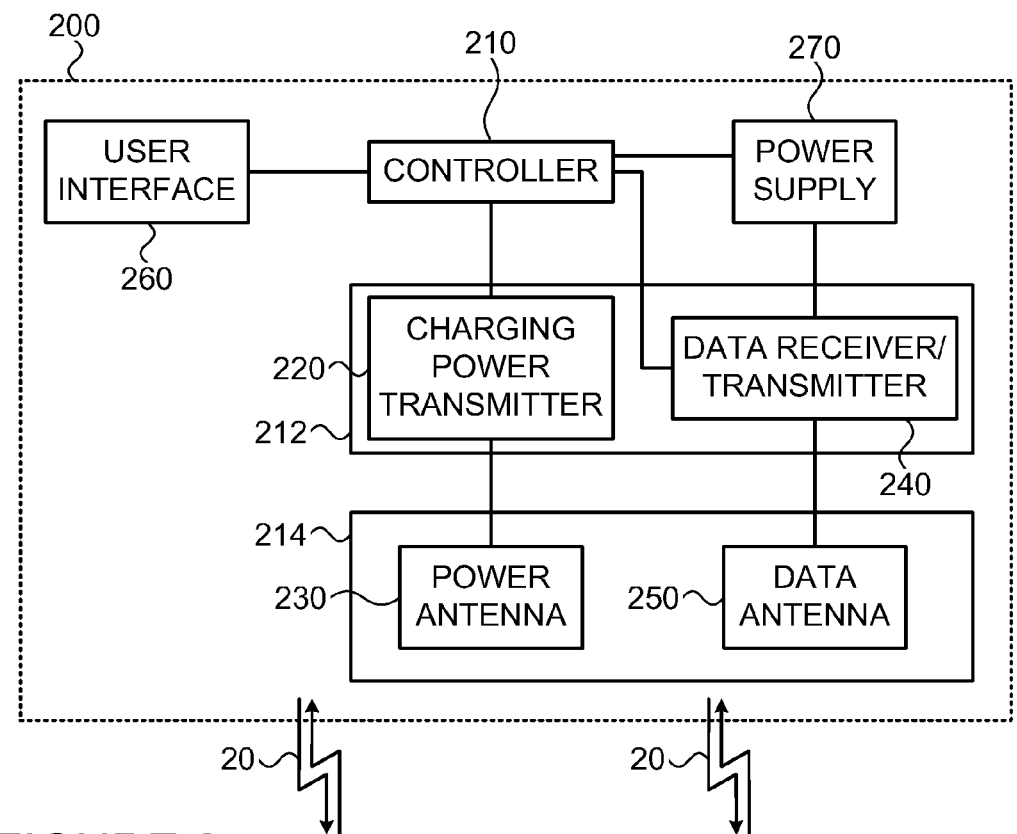
FIG. 2 is a schematic block diagram of an example of a charging device of the present invention for charging remote consumer devices.

Reference is now made to FIG. 2 which schematically illustrates a specific but not limiting example of the charging device 200 suitable to be used in the smart remote charging system 100 of the invention configured and operable for charging a plurality of consumers. The charging device 200 includes a controller 210, a transceiver (receiver/transmitter) unit 212, an antenna unit 214, and a power supply unit 270 that supplies power to the controller, transceiver unit and antenna unit. The transceiver unit 212 includes a charging power transmitter 220 and a data receiver/transmitter 240. The antenna unit 214 includes a power antenna 230 connected to the charging power transmitter 220, and a data antenna 250 connected to the data receiver/transmitter 240. Also typically provided in the charging device is a user interface 260.

In some embodiments, the charging device 200 may include one antenna that functionally operates as a power antenna and as a data antenna.

The controller 210 may be configured for initiating the charging process of at least one consumer upon demand, i.e. in response of receipt of a request signal/data from the specific consumer in need for charging. The request signal is received by the antenna unit 214, e.g. picked up by its data antenna 250, and delivered through the transceiver unit 212 (e.g. its data receiver/transmitter 240) to the controller 210. As indicated above, the consumer-related data received by the transceiver unit 212 may include, without limitation, the presence of the specific or potential consumer; the charging zone of the charging device 200; and/or a request for charging, and/or the position of the specific consumer requesting charging. The controller 210 is configured and operable for identifying the received activating data/signal and generating a control signal to the charging power transmitter 220, which in turn activates the power antenna 230 or a dedicated segment thereof as will be exemplified below.

The controller 210 may be configured for defining a charging protocol, e.g. by deciding, upon the received information, on the beginning of a charging session, the duration of the charging session and the direction of charging. In addition, the controller 210 may be further adapted to optimize the amplitude, direction and frequency of the charging signal to the capabilities of an energy harvesting circuit (330 in FIG. 3) of the consumer device. After a charging protocol is defined, the controller 210 generates instruction to the charging power transmitter 220 to deliver radiation, via the power antenna 230, to the demanding consumer. The charging process may be performed for one consumer at a time or to several consumers simultaneously.

In the simplest configuration, once the charging process is initiated by a specific consumer and the charging device is activated, it may transmit the same radiation in one or more directions, and thus all consumers located in the charging zone would be served. In some other embodiments, the charging process is performed for a dedicated identified consumer, or for an identified location of a demanding consumer, or for a dedicated direction associated with the demanding consumer.

In accordance with some embodiments of the invention, user interface 260 is used for providing indication to a user on the charging process, and/or may contain information about the level of energy stored in each consumer device.

Power supply 270 is preferably connected to the main AC power network, e.g. that of 220V or 110V, and it supplies power to the controller 210, the transceiver unit 212, and to user interface 260. Additionally or alternatively, the charging device 200 may further include either one of a USB connector, a battery, and a harvester for utilizing energy from the surroundings, and combinations thereof. An example of a harvesting system that may be utilized in the charging device of the present invention is described in the co-pending U.S. patent application Ser. No. 13/116,554, which is assigned to the assignee of the present application and which is incorporated herein by reference.

Figure 3:
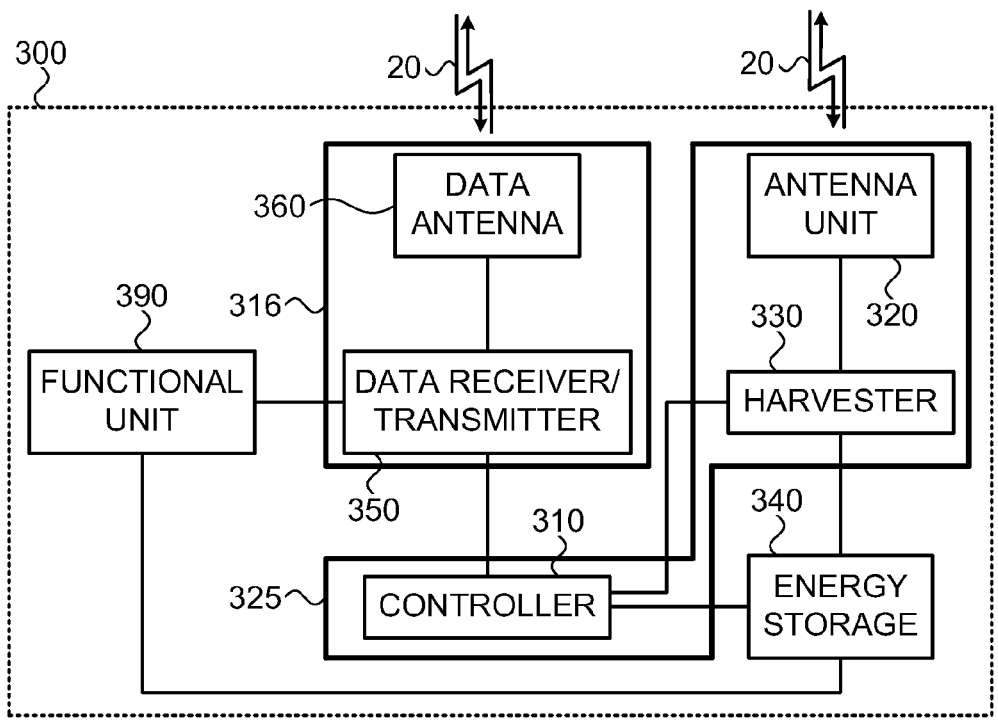
FIG. 3 is a schematic block diagram illustration of an example of a consumer (client) device according to the invention.

Reference is now made to FIG. 3 which is a schematic example of the configuration of a consumer device 300 that can be served by the smart remote charging device 200. In the example illustrated in FIG. 3, the consumer device 300 includes a functional unit 390 which performs the tasks the specific consumer is aimed for (such as computer mouse, television remote control, medical implanted/attached device, etc.), equipped with or connected to its energy storage (battery) 340. The consumer device 300 is further equipped with a communication unit 325 according to the invention including a controller 310; an antenna unit 320; and a harvester circuit 330 connected to the energy storage 340. The communication unit 325 may also include a data unit 316 including a data receiver/transmitter 350 and a data antenna 360.

The controller 310 may be configured for monitoring (continuously or periodically) stored energy level in the energy storage 340, and, upon identifying a limited energy condition (according to predetermined thresholding), generating a request signal addressed to the specific charging device. Alternatively, or additionally, the controller may be preprogrammed to periodically generate a request signal to the charging device, in accordance with an priory known energy consumption of the energy storage 340 based on the operation of the functional unit 390. Also, the controller 310 may be configured to generate additional data/information, e.g. required for radiation optimization. The information may include the specific location of the consumer relative to charging device as well as other relevant parameters, or it may include only information on the identity of the specific consumer. This additional information may be embedded in or accompany the request signal. For example, the request signal may be data modulated (e.g. amplitude and/or phase and/or frequency modulation), and the charging device may be configured to retrieve the relevant data from the modulation.

The antenna unit 320 receives the charging radiation 20 from the charging device and transfers it to the harvesting circuit 330 which is controllably connected to the energy storage 340 of the functional unit 390. The energy storage 340 has a capacity to activate the functional unit 390 for a period of time of up to a predetermined time, determined by the nature of functional unit 390.

In some embodiments, the controller 310 operates to transmit data/information regarding the presence of the consumer 300 in the specific charging zone thereby presenting a demand/request for charging. This data may be transmitted via the data receiver/transmitter 350 and data antenna 360. Alternatively, the controller operates to transmit both the request signal via the antenna unit 320 and additional data (e.g. identification or location data) via the data receiver/transmitter 350 and data antenna 360.

The harvester circuit 330 may be active at all times for capturing electromagnetic radiation in the RF range that is available in the air. The source of the RF radiation may be any device that radiates RF radiation (cellular phone, wireless device, etc.) and that is equipped with the above-described charging device 200. At the consumer side, the energy captured is transformed into a DC power by a rectifying unit within the harvester circuit 330 and delivered to energy storage element 340, which delivers the needed energy to the functional unit 390.

The energy storage element 340 may include a sensing unit for determining the level of the stored energy and generating data indicative thereof to the controller 310, which calculates time required for communication with the remote charger (device 200 in FIG. 2) to fully re-charge the energy storage element 340, and generates the request signal/data. It should be understood that the consumer device 300 may include one antenna 320 that operates as a power antenna and as a data antenna.

In some applications of the present invention, the functional unit 390 in the consumer device 300 is an implanted/attached medical device. In other words, such medical device is equipped with/connected to the communication unit 325.

In some embodiments of the invention, the charging process is mainly managed by the external charging device 200, i.e. by its controller, which is configured and operable for receiving (continuously or periodically) measured data from the consumer 300 (its controller 310 or directly from the sensing unit of energy storage at the consumer) about the charge level of the battery, and determining whether charging of this specific consumer is needed. The charging device may be configured and operable to be responsive to such measured data for carrying out at least one of the following: scheduling the charging process, optimizing the transmission parameters, monitoring the charging process based on data received from the controller of the consumer device or the sensing unit, and alerting the process if charging fails or is complete. It should be noted that during the charging process there might be some recess in the power transferring for communication reason between the device and the charger (charging condition etc.).

As for the consumer device, it may be configured and operable for capturing energy from suitable external RF radiation sources, and charging the battery of its associated functional unit (e.g. implanted medical device). The consumer device may be adapted for storing the received energy in a storage unit of the harvesting circuit, as well as informing the external charger about the/presence/location of the consumer device in the charging area, and informing the external charging device on the amount of stored energy and transferring measurement results performed internally.

In accordance with some embodiments, a person that is in need for an implanted/attached medical device may install/place a charging device in a location he spends a considerable amount of time in, such as but not limited to a living room, a bedroom, a kitchen, or else. The charging device will be responsible for charging the battery of the implanted/attached medical device. In such variation, the charging process does not require any action from the patient, besides being in the vicinity of the external charging device in a scheduled time. If the preset schedule is not convenient, the patient has the ability to change it. In accordance with variations of the present invention the external charging device may be portable and the patient may take it with him when the patient is traveling for a relatively long period (e.g. for more than a few days).

In accordance with some other embodiments, the charging process is initiated by the external charging device that generates and transmits a signal to the consumer inquiring on the presence thereof in the charging zone. The external charging device may further address signals to the consumer device inquiring on the amount of stored energy. From the input received, the external charging device sets a charging protocol including duration of charging session, frequency, direction and all other relevant parameters.

The configuration may be such that if the remote charging device fails to identify the consumer in its charging zone (proximity), it keeps sending signals, searching for the consumer, in preset time intervals until the consumer is identified.

Turning back to FIG. 3, the consumer device 300 may continuously pick up RF radiation in the air, and harvesting and storing the respective energy for later use. To this end, the harvesting circuit 330 may include its storage unit, or the storage unit 340 may constitute a separate storage utility for receiving and storing harvested energy and supplying it to an internal battery of the functional unit 390. The energy may be stored in two levels of storage elements. These may include a short term storage element that maintains energy for up to, for example, three days of work of the functional unit (e.g. implanted device), and a long term storage element that is used a backup, in a scenario that a patient carrying the functional unit is for any reason outside the charging zone of the external charging device for more than a few days. A detailed description of this example of the invention is provided below with reference to FIG. 4.

In some embodiments, when the external charging device identifies that the charging process has failed, either because the patient was not in its vicinity for a preset time period defined as risk time, or if the amount of stored energy is not accumulated due to any other reason, the external charging device (its controller) generates a notification message to notify authorized person (the patient and/or medical expert at a remote medical center) on the risky situation. To this end, the charging device may be preprogrammed to communicate with authorized person via dialing a predefined phone number, upon identifying the risky condition.

As indicated above, in some embodiments, the consumer device (e.g. associated with an implanted/attached medical device) may utilize the ability of the functional unit and/or controller of the communication for measuring/monitoring the energy level of the battery to generate a warning signal to the external charging device. Such a warning signal is identified at the charging device as a request to start the charging process.

Figure 4:
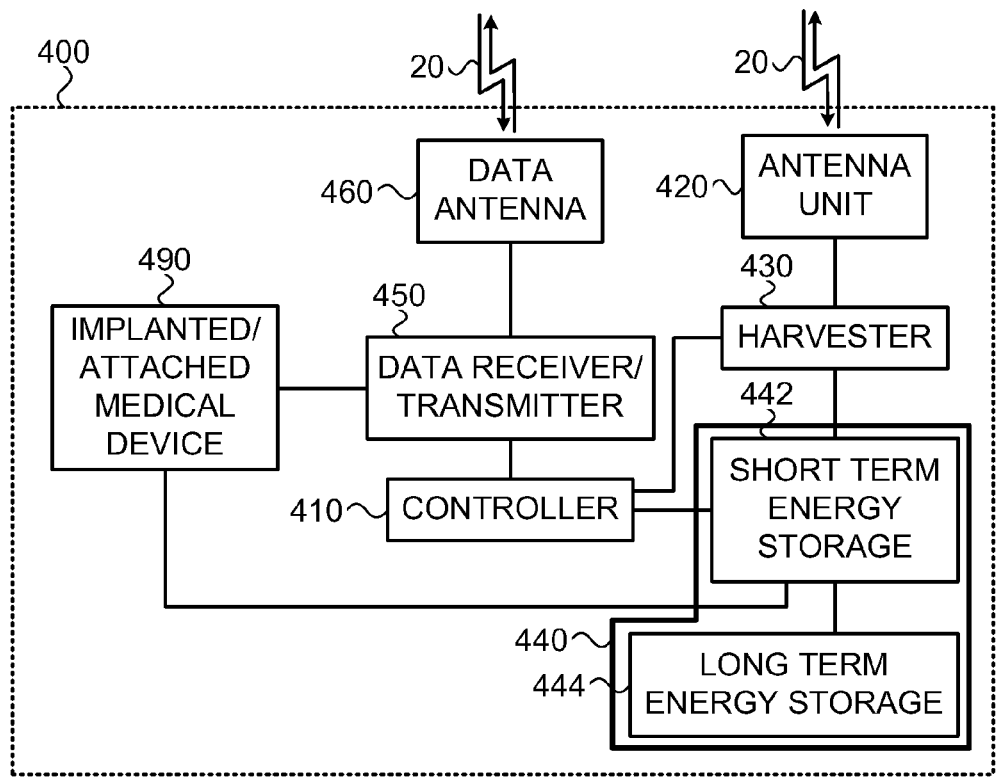
FIG. 4 is a schematic block diagram of another example of the configuration of a consumer (client) device of the present invention.

Reference is now made to FIG. 4, which is a schematic illustration of an example of a consumer device 400. The device 400 is configured generally similar to the above-described device 300, but is exemplified with a functional unit 490 including a medical device that may be implantable in or attachable to a patient's body. The consumer device 400 thus includes a controller 410, an antenna unit 420, a harvester unit/circuit 430, and a storage unit 440, which in the present example has a short term energy storage module 442 and a long term energy storage module 444. Also exemplified in the device 400 is a data receiver/transmitter 450 and a data antenna 460.

It should be understood that the provision of separate data antenna 460 is optional, and the same antenna unit 420 may operate as a power antenna and a data antenna in this case there have to be a break in the power transmitting for communication. It should also be noted that the medical device may be equipped with its internal energy storage (battery) connected to the storage unit 440. The implanted/attached medical device 490 may comprise for example a pacemaker, defibrillator, hearing aid, etc., and in addition it may comprise sensors to measure different parameters, for example a charge sensor for measuring the charge status of the battery.

Controller 410 is configured for monitoring the stored energy level in both short term energy storage 442 and long term energy storage 444, generating a demand/request signal/data to the external/remote charging device (200 in FIGS. 1-2) as described above; and controlling receipt of radiation from the charging device and its transfer to the medical device 490.

Short term energy storage 442 may have a capacity to activate the medical device for a period of several hours, for example up to 24, 48 or 72 hours. Long term energy storage 444 may have a capacity to activate the medical device for a longer period of time, for example up to a one week, two weeks, or a month.

Data receiver/transmitter 450 may be adapted to receive from the external charging device (e.g. its data receiver/transmitter 240) questions regarding the presence of the device 400 in the charging zone. In accordance with variations of the invention it may further receive questions regarding the amount of energy stored in the short term energy storage element 442, as well as other relevant questions. The questions are delivered to controller 410 and the answers received from controller 410 are delivered back to data receiver/transmitter 450 that transmits the information to data receiver/transmitter 240 in the external charging device 200 via data antenna 460.

Harvester 430 is active at all times capturing radiation energy 20, preferably in the RF range that is available in the air. The source of the RF energy can be any device that radiates RF energy (cellular phone, wireless device, etc.) and it has the charging device 200. The configuration and operation of the harvester 430 is not limited to the frequency of the charging device; it may harvest from other frequencies as well. The energy captured is transformed into a DC power by rectifying unit within harvester 430 and then delivered to short term energy storage element 442.

Short term energy storage element 442 receives the energy from harvester 430 and delivers the needed energy to the medical device 490. The access energy may be delivered to long term storage element 444 or it may remain in short term storage 442.

In accordance with variation of the invention, both short term energy storage element 442 and long term energy storage element 444 include appropriate sensors adapted to measure the level of stored energy in order to allow calculation of the time duration required for activating external charging power transmitter 220 of charging device 200 (FIG. 2). Alternatively, the consumer device 400 may utilize one energy storage unit with a predefined capacity as illustrated in FIG. 3 with reference to other consumers.

The present invention also provides a novel antenna unit for use in the charging device. Such antenna unit includes a plurality of antenna elements arranged in an array in a manner that the maximal gain of the array is higher than the maximal gain of any single antenna with the same beam width, radiation pattern and direction of the antenna array is provided. The arrangement of antenna elements in the array is such as to provide a radiation pattern covering a certain angular regions, i.e. a region having at least a part of a circle (circular segment) in a cross section. For example, the antenna elements are arranged along at least a path of a closed-loop (e.g. circular) path or the like.

It should be understood that the arrangement of antenna elements is not limited to a physical circular arrangement, they may be of any suitable physical arrangement, but the radiation pattern produced by the antenna element has angular distribution. To this end, the antenna elements include the elements transmitting and receiving radiation with solid angles defining different general propagation directions. Thus, the entire antenna unit is formed by multiple directional antenna elements.

Each directional antenna element may be configured to efficiently receive and/or transmit radiation of any polarization, including without limitation: linear polarization (i.e. horizontal polarization, vertical polarization and diagonal polarization), circular polarization, and elliptical polarization. The positioning of the plurality of such directional antenna elements in the array prevents negative interactions between the elements, and further allows for maximizing the gain of each directional antenna element. The arrangement of the elements is selected by considering the effects they have on the radiation patterns of one another, caused by mutual influence, to provide high performance by utilizing the mutual influence between the elements to receive the best performance of each element in the array.

In some embodiments, at least some of the directional antenna elements of the array may be configured such that their fields of view (solid angles of transmission/reception) are partially overlapping so as to obtain maximal gain in at least one preferred direction.

In some embodiments, the array of antenna elements may be configured such that at least one directional antenna element serves, in a certain time point, a reflector to another directional antenna element in the array, to thereby increase the antenna efficiency. To this end, the antenna elements are spaced from one another along one or more axes. For example, when electromagnetic radiation is transmitted/received by a first directional antenna element along X axis, other directional antenna elements that are positioned that are spaced from the first antenna element along Y- or Z-axis are functionally operating as reflectors to the first directional antenna element on X axis, thus the energy transmitting/receiving performance by this first antenna will be higher than the transmitting/receiving performance without the reflection effect of the other antenna elements.

The antenna array provided herein may be associated with a medical device, or a home used device, or any other electric device capable to be charged by a remote charging device described above. The antenna array may be used with (e.g. integrated in) an electromagnetic harvesting system to thereby allow an improved intake of energy from the surroundings. Additionally, according to some embodiments of the invention, the antenna array provided herein is utilized in communication systems and is adapted for transmitting and receiving data.

Figure 5A:
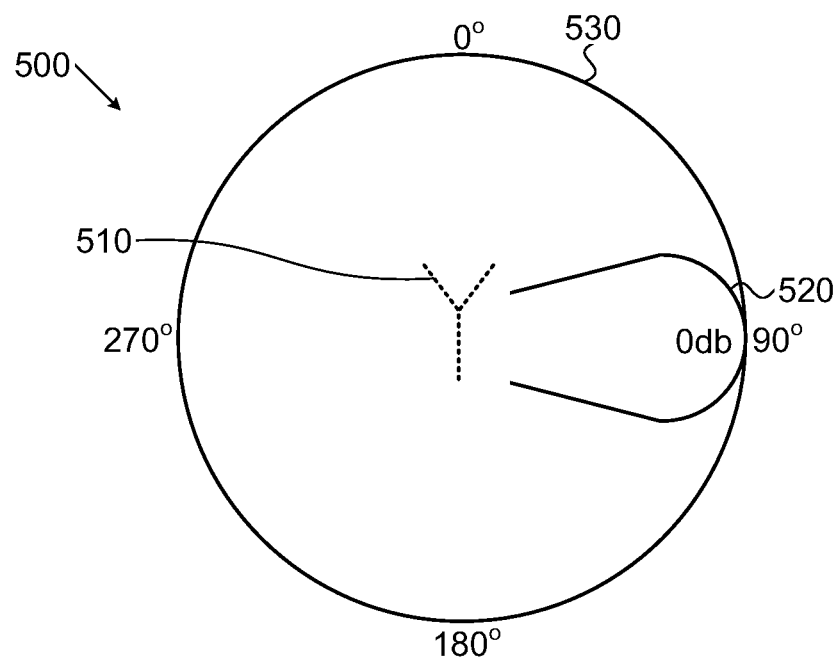
FIGS. 5A to 5C are schematic illustrations of radiation patterns of different antennas, where

FIG. 5A is a schematic illustration of a typical radiation pattern 500 of a directional antenna. Most antennas show a pattern of "lobes" or maximal radiation. In the example illustrated in this figure, a directional antenna 510 has its main lobe 520 toward a 90° direction. In that direction, antenna 510 has its maximal gain on the tangent point with the 0 db circle 530 indicating the maximal radiation of antenna 510 in a desired direction of propagation. Other lobes (side lobes) are not shown in this figure.

Figure 5B:
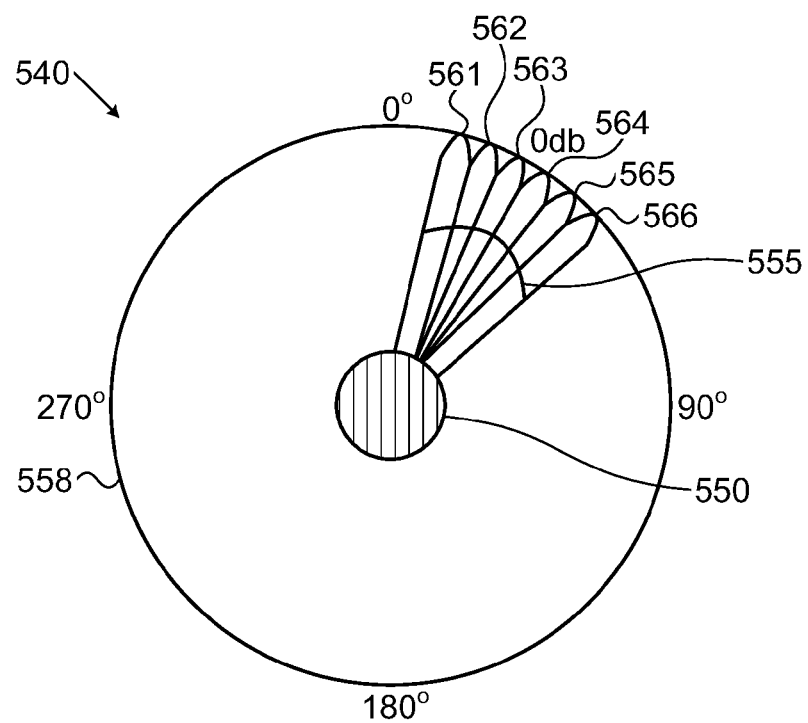

Reference is now made to FIG. 5B that schematically illustrates a radiation pattern 540 of directional antenna array in accordance with an example of the present invention. A directional antenna array 550 may include any number of directional antenna elements, from at least two elements up to hundreds, thousands, dozens of thousands, and even more elements, while each directional antenna element in the array functionally operates as a directional antenna with specific, predetermined beam width and maximal gain. The maximal gain of the array is a superposition of gain of the directional antenna elements in the array. As the maximal gain of each antenna element is inversely proportional to its band width, when the number of directional antenna elements in a fixed angle array is increased, the maximal gain of the array is increasing, due to the fact that each antenna element has a narrower beam width and therefore a higher maximal gain. Additionally, each directional antenna element in the array is preferably, but not necessarily, different from the other directional antenna elements in the array with reference to its main lobe direction, thus, providing a total beam width that is higher than the beam width of each directional antenna element in the array. As indicated above, the directional antenna elements in the array may further provide overlapping in the radiation transmission/reception. Generally, the antenna array may be designed in various configurations according to the application and need.

In the specific but not limiting example illustrated in FIG. 5B, the antenna array 550 includes six directional antenna elements in a certain predetermined configuration. Each directional antenna element has a respective main lobe denoted in the figure as 561-566. The maximal gain of directional antenna array 550 (on the tangent point with the 0 db circle 558) is higher than the maximal gain of a single directional antenna with a similar beam width represented by line 555 that has a lower gain than the antenna array.

Figure 5C:
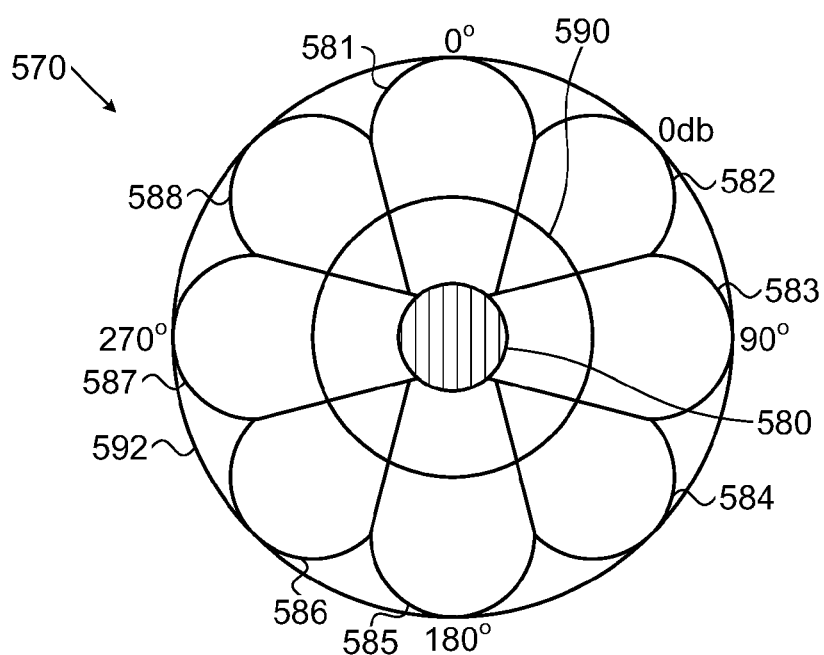

FIG. 5C is a schematic illustration of an "omnidirectional" antenna array radiation pattern 570 in accordance with variations of the present invention, in which the antenna array is configured for transmitting/receiving with maximal gain to all directions. Similarly to directional antenna array 550 illustrated in FIG. 5B, the "omnidirectional" antenna array 580 may also include various number of directional antenna elements. The directional antenna elements in the array are preferably configured and oriented so as to generate together substantially omnidirectional radiation pattern. As shown in the figure, in such variation, the omnidirectional antenna array maximal gain is higher than the maximal gain that may be obtained by a single omnidirectional antenna denoted by line 590.

In the non-limiting example illustrated in FIG. 5C, the omnidirectional antenna array 580 includes eight directional antenna elements each having a respective main lobe 581-588. The maximal gain of omnidirectional antenna array 580 (on the tangent point with the 0 db denoted by circle 592) is higher than the maximal gain of a single omnidirectional antenna 590.

The improved abilities of the novel antenna unit provided herein are suitable for use in a remote charging system of the invention serving dynamic multiple consumers located in different positions relative to the charging device and changing their positions, either in a continuous manner (e.g. a patient carrying an implanted medical device that is moving in the room during the charging process), or in a random manner (e.g. a TV remote control that the user change its position every time he uses it).

Figure 6A:
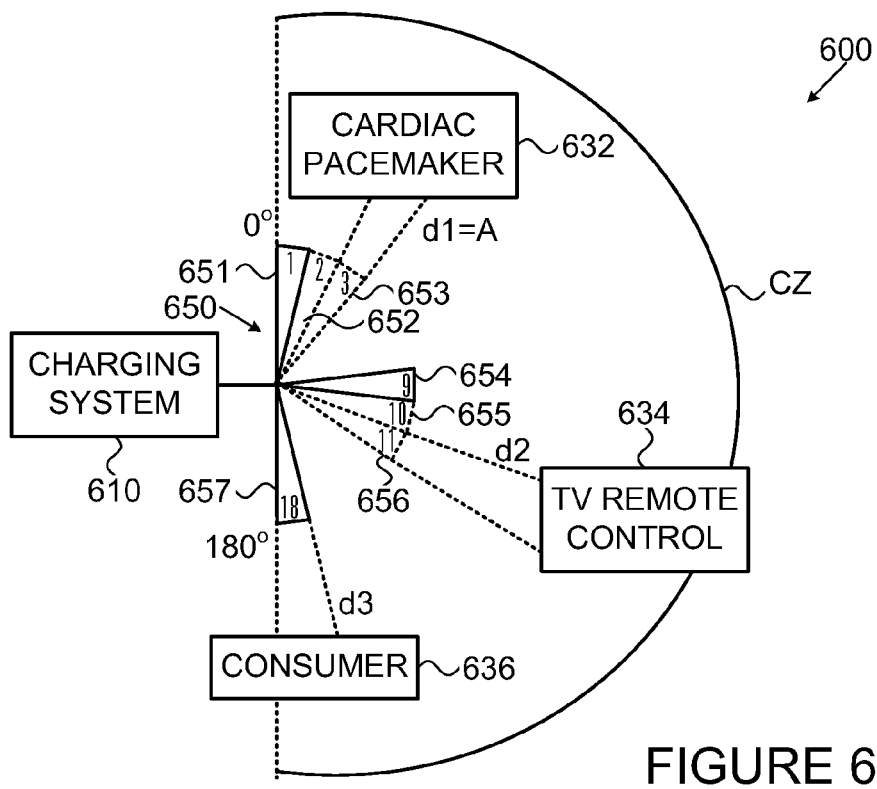
FIGS. 6A-6B are schematic illustrations of a specific example of a remote smart charging system in accordance with the present invention, charging three consumers at a time, while the location of one consumer (cardiac pacemaker) relative to the charging sub unit changes during the charging process.
Figure 6B:
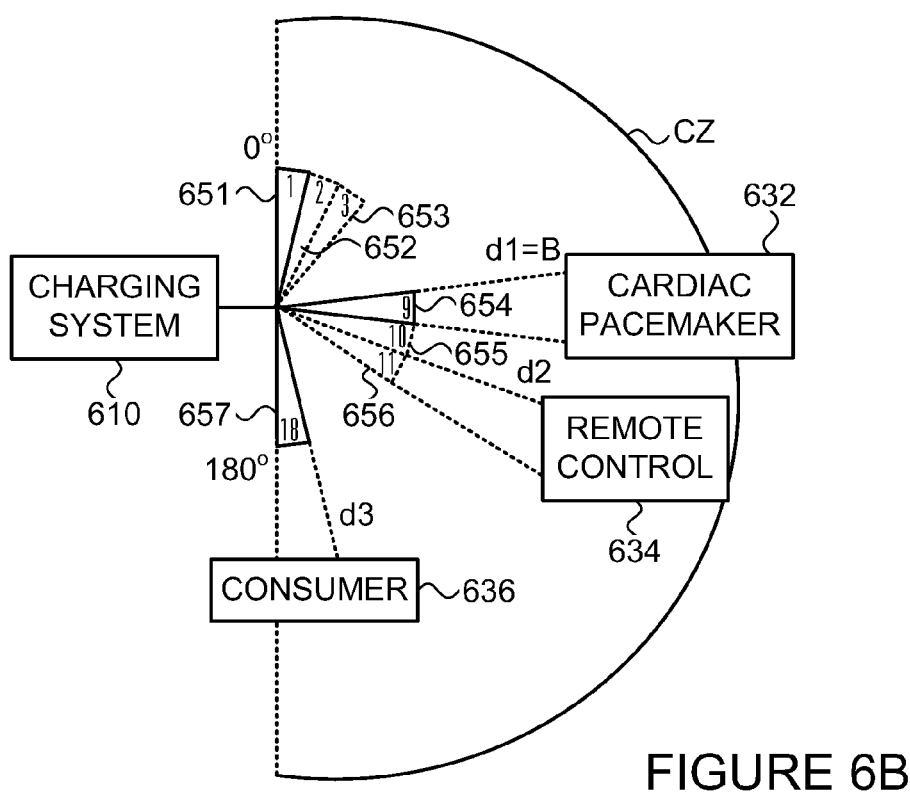

An example of the operation of a smart remote charging system with multiple consumers and an antenna array will now be described with reference to FIGS. 6A-6B. FIGS. 6A-6B illustrate a power on demand charging system that provides high efficiency charging to several peripheral consumers, wherein one of the consumers, a cardiac pacemaker, changes its position (FIG. 6B) relative to a charging device and to its former position shown in FIG. 6A.

The system includes an antenna unit preferably configured according to the invention, namely including an array of several highly directive antenna elements each defining its charging zone and all together covering the entire charging space. The charging zone of each directive antenna element covers a specific angular region/segment of the desired charging space. The usage of this highly directivity antenna array provides the same area coverage that could be received with a standard antenna, but the main difference is in the highly directive reception/transmission to/from limited and specific region/zone in the charging space during the charging session. With this technique the charger can beam radiation only to the specific consumer that needs to be charged without undesired waste of energy to rest of the space. The usage of high directivity antenna provides the ability to concentrate the charging energy to a specific and limited zone with high efficiency. Thus, the charging process is faster and more efficient.

When a consumer needs to be charged, it sends a charging request to the charger, and the request is received by the antenna array. By identifying in which antenna of the antenna array the request is received, the system determines where exactly in space the consumer is located and can send the charging radiation directly to the specific and limited zone where the consumer is located.

During the charging process, communication is established between the charger and the consumer in order to follow the charging process. The consumer can provide information on how much energy it needs, its battery status, a request to stop the charging process and other data that may influence the charging process and charging duration.

Multiple consumers are typically located at different locations at distances from the common charging device and might require different amounts of power for charging. The charging device, in response to the request for charging from each consumer (via a specific antenna/s of the antenna array), starts the charging process from the most relevant high directivity antenna/s for each consumer.

Preferably, the charging process begins with a predefined power level to establish communication and crucial charging information transfer from the consumer to the charging device. This information is based on the distance between the charging device and the consumer, distance which affects the amount of energy that the consumer will receive and the required amount of power that is needed by the consumer. For example, a cardiac pacemaker requires receiving 0 dbm (1 mW) for its charging process, this amount of power depends on the amount of the transmitted power from the charging device, the distance between the charging device and the consumer, the transmitting frequency, the consumer antenna gain and the antenna gain of the charger. In this process, the consumer is tuning the charging device until it reaches the exact amount of power the consumer requires. The consumer is also informing the charging device about the charging progress and about the completion of the charging process.

FIG. 6A is a schematic illustration of a smart remote charging system 600 in accordance with some embodiments of the present invention. System 600 includes a charging device 610 of the present invention including or associated with an antenna unit including antenna array 650 composed of eighteen (18) directive antennas. Shown in the figure are directive antennas 651, 652, 653, 654, 655, 656, and 657. Smart remote charging system 600 also includes various consumers such as a cardiac pacemaker 632, a Television (TV) remote control 634, and additional consumer 636 (e.g. an air condition remote control, a camera, an audio player, etc).

In FIG. 6A the cardiac pacemaker 632 is shown as being positioned in an angle between 20°-30° relative to the charging device 610 being in the charging zone of the third directive antenna 653 at a distance d1=A from the charging device 610. In this specific not limiting example, cardiac pacemaker 632 needs to receive 0 dbm (1 mW) from the charging device 610. In the example of FIG. 6B, the cardiac pacemaker 632 changes its position relative to the charging device 610 and is at a distance d1=B from the charging device 610 being thus in the charging zone of the ninth directive antenna 654. The antenna gain of antenna 653 and antenna 654 is the same, so the only parameter that affects the power loss between both locations is the distance from the charging device, assuming A≠B.

In order to keep the required amount of energy provided to the cardiac pacemaker 632, the charging device 610 needs to vary (increase/decrease) the transmitted power relative to the distance d. If A>B, then the transmitted power needs to be decreased, and if A<B it needs to be increased according to Friss equation which is used to calculate the amount of energy needed to be transmitted from the charging device to the cardiac pacemaker, as follows:

$$\frac{Pr}{Pt} = GrGt\left(\frac{\lambda}{4\pi d}\right)^2$$

wherein
Pr=Power receiving
Pt=Power transmitting
d=Distance
Gt=Transmitting antenna gain
Gr=Receiving antenna gain $$\lambda = \frac{c}{f} = \text{Wave length}$$

When the cardiac pacemaker "changes" its location within the charging space of the entire antenna unit, the receiver in the charging device indicates the power transmitter via the controller (all illustrated in FIG. 2) about the new location in order to switch to another antenna in the array. When the antenna unit of the cardiac pacemaker is getting out of the charging zone (angle covered by) the active antenna in the array, the amount of the received energy decreases, and when the received power reaches a predefined low level, the cardiac pacemaker sends a new request for charging. This massage is received by the charging device via a specific directive antenna/s in the antenna array and charging is proceeded via the relevant antenna from the array according to the new location of the cardiac pacemaker.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A consumer device configured and operable for communicating with a charging device, wherein the charging device comprises a transmitter unit associated with an antenna unit comprising a power antenna configured to define at least one charging zone for transmitting charging power to said at least one charging zone, a receiver for receiving signals from consumers located within said charging zone, and a controller unit, said controller being configured and operable to be responsive to a request signal from a consumer indicative of demand for charging to initiate a charging process of the consumer by radiation from the antenna unit toward said consumer to supply power required for operating a functional unit of said consumer, the consumer device comprising: a functional unit requiring electric power for operation, and a communication unit comprising a consumer controller, an antenna unit for receiving electromagnetic radiation from surroundings and generating electric output, and a harvester circuit configured for receiving the electric output of the antenna unit and transferring corresponding power to an energy storage unit associated with said functional unit, the consumer controller being configured and operable for generating a request signal addressed to the remote charging device indicative of a demand for charging said energy storage unit.

2. The consumer device according to claim 1, wherein the consumer controller is configured and operable to carry out at least one of the following: for monitoring stored energy level in the energy storage unit, and, upon identifying a limited energy condition, generating said request signal to a remote charging device; for periodically generating the request signal to a remote charging device, in accordance with a priory known energy consumption of the energy storage unit based on the operation of the functional unit; and to be responsive to inquiring signals from a remote charging device to monitor stored energy level in the energy storage unit, and, upon identifying a limited energy condition, generating said request signal to the remote charging device.

3. The consumer device according to claim 1, further comprising a data unit comprising a data transceiver and a data antenna adapted to transmit and receive data toward and from the charging device.

4. The consumer device according to claim 1, wherein said functional unit comprises one of the following: a remote control, a medical device, an imager, a mobile phone, a media player, a personal computer wireless accessory, and a home use wireless device.

5. The consumer device according to claim 4, wherein said remote control comprises one of the following: a television remote control; an air condition remote control, a DVD player remote control, a smart home general remote control, an electric shutter remote control; said medical device comprises one of the following: a hearing aid, a cardiac pacemaker, a cardiac defibrillator; said personal computer wireless accessory comprises one of the following: a computer mouse, a computer keyboard, wireless loudspeakers, wireless headphones; and said home use wireless device comprises one of the following: a wireless electric shaver, a wireless electric tooth brush, and a wireless electric hair removal.

6. A charging system for remotely charging multiple consumer devices upon demand from the consumer devices, the system comprising:
  at least one charging device comprising a transmitter unit associated with an antenna unit comprising a power antenna configured to define at least one charging zone for transmitting charging power to said at least one charging zone, a receiver for receiving signals from consumers located within said charging zone, and a controller unit, said controller being configured and operable to be responsive to a request signal from a consumer indicative of demand for charging to initiate a charging process of the consumer by radiation from the antenna unit toward said consumer to supply power required for operating a functional unit of said consumer; and
  at least one consumer device being a subscriber of said at least one charging device, the consumer device comprising a functional unit requiring electric power for operation, and a communication unit comprising a controller unit, an antenna unit for receiving electromagnetic radiation from surroundings and generating electric output, and a harvester circuit configured for receiving the electric output of the antenna unit and transferring corresponding power to an energy storage unit associated with said functional unit, the controller unit being configured and operable for generating the request signal addressed to said at least one remote charging device indicative of a demand for charging said energy storage unit, and for identifying a position of the consumer from the received request signal by identifying its distance and its relative angle from the receiver.

7. The charging system according to claim 6, wherein said controller of the charging device is configured and operable for identifying a change in the position of the consumer during a charging process to optimize its charging in a new position.

8. The charging system according to claim 6, wherein the controller of the charging device has at least one of the following configurations: (i) is configured and operable in a push mode to initiate transmission of inquiring signals from a transmitter to the charging zone to cause the consumer to transmit the request signal indicative of the demand for charging; and (ii) controller is configured and operable in a pool mode to be activated by communication initiated by the consumer.

9. The charging system according to claim 6, wherein said power antenna of the charging device comprises an array of one or more directional antenna elements, each antenna element defining the charging zone within a different angular segment of entire charging space defined by a radiation pattern of the antenna array.

10. The charging system according to claim 6, configured and operable for charging more than one consumer simultaneously.

11. The consumer system according to claim 6, wherein the consumer controller has one of the following configurations: (a) is configured and operable for monitoring stored energy level in the energy storage unit, and, upon identifying a limited energy condition, generating said request signal to a remote charging device; (b) is configured and operable for periodically generating the request signal to a remote charging device, in accordance with a priory known energy consumption of the energy storage unit based on the operation of the functional unit; (c) is configured and operable to be responsive to inquiring signals from a remote charging device to monitor stored energy level in the energy storage unit, and, upon identifying a limited energy condition, generating said request signal to the remote charging device.

12. The consumer system according to claim 6, further comprising a data unit comprising a data transceiver and a data antenna adapted to transmit and receive data toward and from the charging device.

* * * * *

UNITED STATES PATENT AND TRADEMARK OFFICE
CERTIFICATE OF CORRECTION

PATENT NO. : 9,711,978 B2  
APPLICATION NO. : 14/376192  
DATED : July 18, 2017  
INVENTOR(S) : Asaf Manova-Elssibony and Oded Golan It is certified that error appears in the above-identified patent and that said Letters Patent is hereby corrected as shown below:

On the Title Page

Replace the inventor name "Oded Galan" with --Oded Golan--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*